United States Statutory Invention Registration [19]

[11] Reg. Number: H682

Betts [43] Published: Oct. 3, 1989

[54] EROSION RATE DETERMINATOR: ROCKET NOZZLE

[75] Inventor: Robert E. Betts, Huntsville, Ala.

[73] Assignee: The United States of America as represented by the Secretary of the Army, Washington, D.C.

[21] Appl. No.: 316,199

[22] Filed: Feb. 27, 1989

[51] Int. Cl.[4] ..... G01N 17/00

[52] U.S. Cl. ..... 73/86

*Primary Examiner*—Thomas H. Tarcza
*Assistant Examiner*—Linda J. Wallace
*Attorney, Agent, or Firm*—Freddie M. Bush; James T. Deaton

[57] ABSTRACT

In a method for determining and evaluating nozzle erosion rate, an eroding nozzle and a non-eroding nozzle are employed in a dual nozzle arrangement to receive a balanced thrust and flow rate from a common solid propellant grain of a solid propellant rocket motor when initially fired. When erosion of the eroding nozzle begins an increase in throat area results and the mass discharged through throat increases thereby causing an imbalance in thrust. The erosion is correlated to the mass flow rate of the solid propellant rocket motor by the mathematical relationships, $F_2\ P_{C2}\ (A_{t2}+\Delta A_{t2})C_{F2}$, wherein $F_2$ is force, $P_{C2}$ is chamber pressure, $A_{t2}$ is throat area, $\Delta A_{t2}$ is change in throat area due to erosion, and $C_{F2}$ is the thrust coefficient. Thus, the erosion rate of the eroding nozzle is determined and evaluated as a result of the increase of thrust and the flow rate which causes an imbalance in the thrust due to erosion products discharged and a change in value of the $A_{t2}$ plus $\Delta A_{t2}$.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

EROSION RATE DETERMINATOR: ROCKET NOZZLE

DEDICATORY CLAUSE

The invention described herein may be manufactured, used, and licensed by or for the Government for governmental purposes without the payment to me of any royalties thereon.

BACKGROUND OF THE INVENTION

The current method of making measurements by which the erosion rates of rocket nozzles can be determined and evaluated comprises firing a rocket motor and exhausting the gases through a test nozzle, measuring the thrust and pressure while firing, and measuring the throat area before and after firing. By this method any erosion occurring during the ignition transients are not detectable due to ringing of the gauging systems.

A device by which the erosion rates of rocket nozzles can be more precisely measured and evaluated would be a significant contribution to the art of nozzle evaluation and design to performance standards.

Therefore, an object of this invention is to provide a device which enables an initial thrust, to be balanced as compared to a non-eroding nozzle, regardless of any pressure transients, so that the start of erosion is readily detectable.

SUMMARY OF THE INVENTION

A solid propellant rocket test motor is provided two nozzles that are equal in throat area and expansion in a test set-up to determine erosion and erosion rate based on a change in thrust. Nozzle No. 1 is made of carbon or molybdenum or other materials which do not erode. Nozzle No. 2 is made of eroding materials selected from composites of phenolics filled with glass, asbestos, or metals which erode during rocket motor operation.

During a test set-up, at the initial conditions, flow through each nozzle is equal; thus, thrust is balanced. As erosion starts there is an imbalance in thrust. The test motor has fixtures which provides lugs or supports which allows thrust measurement in line with the gas flow. Pressure gauges are attached to the solid propellant rocket test motor to measure pressure versus time within the motor. Thus, the thrust and pressure are measured simultaneously. The coefficients of thrust ($C_F$) or coefficients of force are equal at initial conditions and during burning regardless of the change of throat area. Since $C_F$ is constant and the motor pressure is the same for both nozzles the throat area change for the eroding nozzle can be correlated to the motor pressure. The relationships of mass discharge at any time $(T)=\dot{M}=P_C A_t(\text{total}) C_D$, and Areas of nozzles $=A_t(\text{total})=A_{t1}+A_{t2}+\Delta A_{t2}$, wherein $\dot{M}$ is mass rate of flow, $P_C$ is chamber pressure, $C_D$ is coefficient of discharge, $A_{t1}$ is throat area of non-eroding nozzle, $A_{t2}$ is throat area of eroding nozzle, $\Delta A_{t2}$ is change in throat area of eroding nozzle, and $A_t(\text{total})$ is total throat areas of non-eroding and eroding nozzle.

DESCRIPTION OF THE PREFERRED EMBODIMENT

A device by which the erosion rate of a rocket nozzle is more precisely measured and evaluated comprises a mounted solid propellant rocket test motor that is fitted with dual nozzles that are equal in throat area and expansion. One of the nozzles is constructed of a non-eroding material and the other nozzle is constructed of an eroding material. The non-eroding nozzle No. 1 is made of carbon or molybdenum or other materials which do not erode. The other nozzle No. 2 is made of composites such as phenobics filled with glass, asbestos, or may be made of metals which erode during rocket motor operation.

The test motor is provided with fixtures such as lugs or supports which allows thrust measurement in line with the gas flow during motor burning. Pressure gauges attached to the motor measure pressure versus time within the rocket motor.

Since the rocket nozzles are equal in throat area and expansion, at initial conditions flow through each nozzle is equal, thus thrust is balanced. As erosion start there is an imbalance in thrust, and since thrust and pressure are measured simultaneously, the difference in thrust is due only to the erosion and is not masked by burning rate changes or burning surfaces of the propellant.

Figure 1:
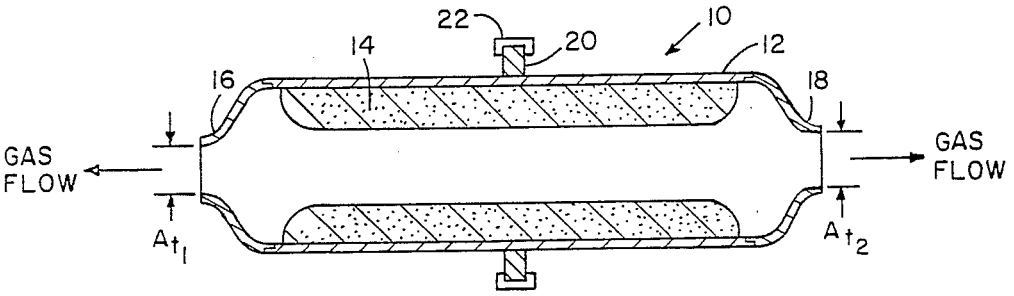
FIG. 1 is a diagramatic view of a horizontally mounted solid propellant rocket motor test vehicle including dual nozzles with matched throat diameters of a non-eroding nozzle and an eroding nozzle.

In further reference to the drawing, FIG. 1 depicts a diagramatic view of a device 10 by which the erosion rates of a rocket nozzle is precisely measured and evaluated. The device 10 comprises a rocket motor case 12 containing a solid propellant grain 14 and fitted with a non-eroding nozzle 16 (without an expansion cone) with a throat area $A_{t1}$ and an eroding nozzle 18 (without an expansion cone) with a throat area $A_{t2}$. Support lugs 20 retain the rocket motor in place during firing and allows thrust measurement in line with the gas flow. Pressure or force gauges 22 are attached to the lugs or the rocket motor case to measure pressure versus time within the rocket motor. The throat diameter areas, designated $A_{t1}$ and $A_{t2}$ for nozzles 16 and 18 respectively, are equal before erosion; that is, $A_{t1}=A_{t2}$ initially. $A_{t2}$ for eroding nozzle is greater after eroding; that is, $A_{t2}+\Delta A_{t2}>A_{t1}$. Nozzle 18 throat area is shown with indicated erosion pattern.

Figure 2:
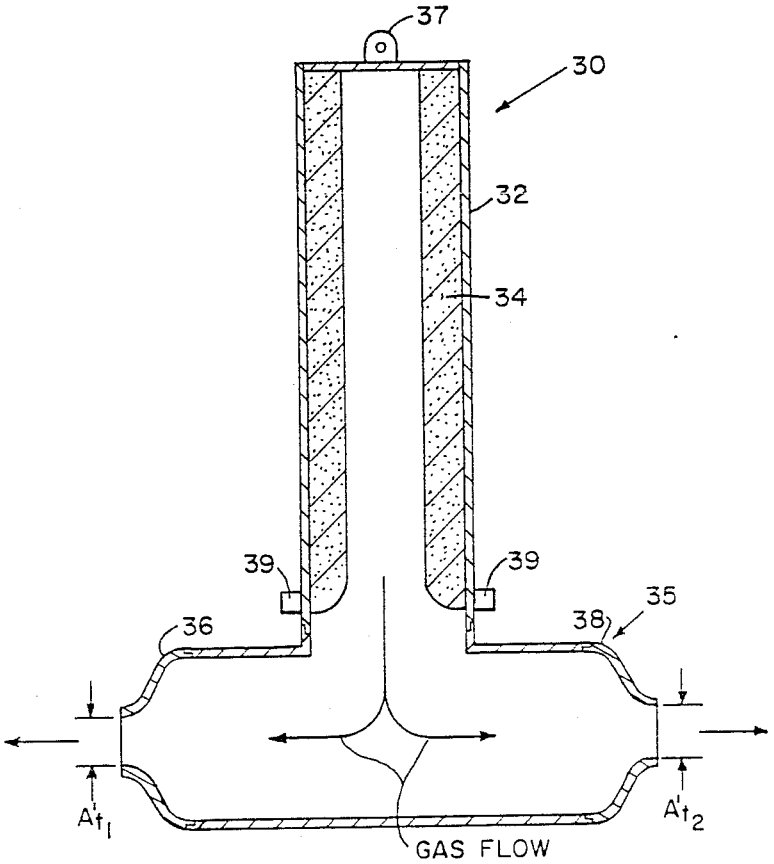
FIG. 2 is a diagramatic view of a pendulous mounted solid propellant rocket motor test vehicle including dual nozzles with matched throat diameter of a non-eroding nozzle and an eroding nozzle.

In further reference to the drawing, FIG. 2 depicts a diagramatic view of a pendulous mounted solid propellant motor test vehicle which is a device 30 by which the erosion rate of a rocket nozzle is precisely measured and evaluated. The device 30 comprises a rocket motor case 32 containing a solid propellant grain 34. A tee shaped (T) configurational pipe fixture 35 is shown connected to the rocket motor case with a non-eroding nozzle 36 (without an expansion cone) with a throat area of $A_{t1}$ and an eroding nozzle 38 (without an expansion cone) with a throat area $A_{t2}$ mounted therein. A support member 37 provides the means for mounting the solid propellant rocket motor test vehicle 30 and balancing the rocket motor test vehicle on a pendulum. Thrust or force gauge 39 is attached to the rocket motor case to measure pressure versus time during the rocket motor operation. The throat diameter areas, designated $A'_{t1}$ and $A'_{t2}$ for nozzles 36 and 38 respectively, are equal; that is, $A'_{t1}=A'_{t2}$ initially. As noted for embodiment 30, as erosion starts in eroding nozzle 38 there is an imbalance in thrust, and since thrust and pressure are measured simultaneously, the difference in thrust is due only to the erosion and is not masked by burning rate changes or burning surfaces of the propellant.

The pendulous mounted solid propellant rocket motor test vehicle is balanced by determining the balance point of the test vehicle prior to testing. Any imbalance due to nozzle erosion is detected by force gauges. Erosion is correlated to mass flow through the rocket nozzle.

The following mathematical relationship will provide a better understanding of how the area change for an eroding nozzle can be correlated to motor pressure. For example, mass flow rate ($\dot{M}_1$ and $M_2$) relate to non-eroding nozzle and eroding nozzle respectively, where mass flow rate $\dot{M}_1 = P_{C1}A_{t1}C_{D1}$ and $M_2 = P_{C2}A_{t2}C_{D2}$, and wherein $P_{C1}$ and $P_{C2}$ are chamber pressures, $A_{t1}$ and $A_{t2}$ are total nozzle throat areas, and $C_{D1}$ and $C_{Ddi\,2}$ are coefficients of discharge. Also, $F_1$ and $F_2$ and $C_{F1}$ and $C_{F2}$ can be substituted for $\dot{M}_1$ and $\dot{M}_2$ and $C_{D1}$ and $C_{D2}$ respectively wherein F stands for force; thus, $$\frac{\dot{M}_1}{C_{D1}} = P_{C1}A_{t1} = \frac{F_1}{C_{F1}}; \frac{M}{C_{D2}} = P_{C2}A_{t2} = \frac{F_2}{C_{F2}}.$$

Therefore, when $A_{t1}$ does not erode, the initial conditions are: $A_{t1}=A_{t2}$, $P_{C1}=P_{C2}$, $C_{D1}=C_{D2}$, $F_1=F_2$, and $C_{F1}=C_{F2}$; also, when $A_{t2}$ erodes, the conditions during erosion are: $A_{t2}>A_{t1}$, $P_{C1}=P_{C2}$, $F_2>F_1$ and $C_{F1}$32 $C_{F2}$ (with no expansion cone). Since $F_2>F_1$ when erosion occurs, and $F_2-F_1=\Delta F_2$, $\Delta F_2$ is thus measured; therefore, it follows that $\Delta F_2=P_{C1}(A_{t2}-A_{t1}+\Delta A_{t2})=P_{C1}(O+\Delta A_{t2})=P_{C1}\Delta A_{t2}$; when eroding, $A_{t2}=A_{t1}+\Delta A_{t2}$; (also, $A_{t2}>A_{t1}$, when eroding), and the measured thrust is equal to $P_{C1}(A_{t2}-A_{t1})=P_{C1\,l\,\Delta At2}$. Since $P_{C1}=P_{C2}$, $A_{t1}=A_{t2}$(initially), $$C_{F1} = C_{F2}, \frac{F_2}{P_{C2}A_{t2}} = \frac{F_1}{P_{C1}A_t}, \text{ and } F_2 = F_1, \frac{P_{C2}A_{t2}}{P_{C1}A_{t1}},$$

$$\text{the change in area} = \Delta A = \frac{F(\text{measured})}{P_C(\text{measured})} \text{ at anytime } (T).$$

The mass discharge rate at any time $(T)=\dot{M}=P_CA_t(\text{total})C_D$, and $A_t(\text{total})=A_{t1}+A_{t2}+\Delta A_{t2}$. Erosion is then correlated to mass flow rate of the motor. The flow rate through the eroding nozzle is $P_C(A_{t2}+\Delta A_{t2})\,C_D$ at any time (T). Also, erosion is correlated to mass flow rate of the rocket motor at any time (T) by the relationship $F_2=P_{C2}(A_{t2}+\Delta A_{t2})\,C_{F2}$.

The rate of change of thrust is linear with the rate of change in area; therefore, the total erosion and erosion rate at any time (T) is measured, and the total erosion and erosion rate through the total action time of the rocket is also measured.

It is important that the erosion rate determinator of this invention be provided with a nozzle without an expansion cone section as illustrated in the drawing and as further emphasized now. $C_{F1}=C_{F2}$ only when the expansion ratios are equal. With an expansion cone of equal dimensions, $C_{F1}=C_{F2}$ initially; however, as erosion takes place the expansion ratio changes; therefore, $C_{F1}=C_{F2}$ is not equal. When there is no expansion cone the ratio always has a value of one, therefore, $C_{F1}$ always equals $C_{F2}$. Hence when the nozzle includes an expansion cone there is an error in the measured thrust as erosion takes place, but with no expansion cone the measurement of the unbalanced thrust is a true representation. $C_F$ is a function of $\gamma$, P's and A's where $\gamma$ is a gas property which does not change, P's are pressure relationships which if changed, changes proportionally constant and the A's are areas whose expansion ratios are constant; therefore, $C_F$ for both nozzles remains constant through the firing. Expansion ratio is defined as the area of the exit plane (A exit plane) of the nozzle over the area of the throat (A throat). A nozzle with no expansion cone has an expansion ratio of one since the exit plane and the throat area are the same; i.e., $$\frac{A \text{ exit plane}}{A \text{ throat}} = 1.$$

I claim:

1. A method for the determination and the evaluation of the erosion rate of a rocket nozzle, said method comprising:

(i) providing a first nozzle constructed of carbon, or molybdenum or other non-eroding material and designed to a predetermined coefficient of thrust $C_{F1}$ and area of throat $A_{t1}$;

(ii) providing a second nozzle constructed of components of phenolics filled with glass or asbestos or an eroding metal material and designed to a predetermined coefficient of thrust $C_{F2}$ and area of throat $A_{t2}$ said $C_{F2}$ equal to said $C_{F1}$ and said $A_{t1}$ equal to said $A_{t2}$;

(iii) providing a rocket motor comprising a rocket motor case with a solid propellant grain contained within said rocket motor case, said rocket motor case adapted for attachment of said first nozzle and said second nozzle in a dual nozzle arrangement whereby said solid propellant grain when fired discharges products of combustion at an equal rate of force $F_1$ and $F_2$ through each of said nozzles initially, and when said $A_{t2}$ of said second nozzle erodes, said $F_2$ is greater than said $F_1$;

(iv) fitting said rocket motor case containing solid propellant grain with said first nozzle and said second nozzle to provide a balanced thrust and flow rate of said products of combustion at initial firing of said propellant grain;

(v) providing means for measuring thrust and pressure simultaneously; and (vi) firing said solid propellant grain to generate products of combustion to achieve a mass discharge rate at any time (T) equal to $\dot{M}=P_CA_t(\text{total})C_D)$, wherein $C_D$ is coefficient of discharge, $A_t$ total equals $A_{t1}+A_{t2}+\Delta At_2$, and wherein erosion is correlated to mass flow rate of said solid rocket motor at any time (T) by the relationship $F_2$ $P_{C2}(A_{t2}+\Delta A_{t2})C_{F2}$ wherein $P_{C2}$ is chamber pressure, $A_{t2}$ is throat area, $\Delta A_{t2}$ is change in throat area due to erosion, and $C_{F2}$ is the thrust coefficient, and the erosion rate of said eroding nozzle is determined and evaluated as a result of the increase of thrust and flow rate which results in an imbalance because of erosion products and change in value of said $A_{t2}$ plus $\Delta A_{t2}$.

2. The method of claim 1 wherein said rocket motor case is open at both ends and wherein said first nozzle of a non-eroding material is attached on one end of said rocket motor case and wherein said second nozzle of an eroding material is attached on the opposite end of said rocket motor case.

3. The method of claim 1 wherein said rocket motor case is open at one end and closed at the opposite end, and wherein said nozzles are mounted in a tee shaped configurational pipe fixture with said first nozzle of a non-eroding material and said second nozzle being attached in said tee shaped configurational pipe fixture for discharging said products of combustion in opposite directions through each of said nozzles, and wherein said tee shaped configurational pipe fixture is attached to said rocket motor case for directing said products of combustion to achieve a balanced thrust and flow rate of said products of combustion at initial firing of said propellant grain.

* * * * *